United States Patent
Lee et al.

(10) Patent No.: US 7,952,222 B2
(45) Date of Patent: May 31, 2011

(54) HYDRAULIC CONTROL SYSTEM OF VEHICLE

(75) Inventors: Hyun Ku Lee, Seoul (KR); Yoshio Koike, Anjo (JP); Ryogo Kato, Anjo (JP); Yoshizou Akita, Anjo (JP); Kiyotaka Wakamatsu, Anjo (JP)

(73) Assignees: Hyundai Motor Company, Seoul (KR); Kia Motors Corporation, Seoul (KR); Aisin Aw Co., Ltd., Anjo-shi (JP)

( * ) Notice: Subject to any disclaimer, the term of this patent is extended or adjusted under 35 U.S.C. 154(b) by 301 days.

(21) Appl. No.: 12/144,836

(22) Filed: Jun. 24, 2008

(65) Prior Publication Data

US 2009/0152077 A1 Jun. 18, 2009

(30) Foreign Application Priority Data

Dec. 13, 2007 (KR) .................. 10-2007-0130423

(51) Int. Cl.
*B60L 1/00* (2006.01)
*F16H 59/74* (2006.01)
(52) U.S. Cl. ........... 307/9.1; 307/10.6; 477/99; 477/163
(58) Field of Classification Search .................. 307/9.1, 307/10.6; 477/163, 99
See application file for complete search history.

(56) References Cited

U.S. PATENT DOCUMENTS

| 5,967,941 A | 10/1999 | Nishina et al. |
| 6,361,472 B1* | 3/2002 | Murasugi ............. 477/117 |
| 6,676,230 B2 | 1/2004 | Kuno et al. |
| 2007/0283911 A1* | 12/2007 | Nakamura et al. ....... 123/90.16 |

FOREIGN PATENT DOCUMENTS

| JP | 63-266260 | 11/1988 |
| JP | 11-153216 A | 6/1999 |
| KR | 10-0313797 B1 | 2/2002 |

* cited by examiner

*Primary Examiner* — Jared J Fureman
*Assistant Examiner* — Hal I Kaplan
(74) *Attorney, Agent, or Firm* — Morgan, Lewis & Bockius LLP

(57) ABSTRACT

A hydraulic control system includes a key detector that detects whether an ignition key is in an on state, a control portion that outputs different control signals according to whether the engine is on if the key is on, and a valve, such as a solenoid valve, that controls gear shifts according to the control signals from the control portion. A hydraulic control method includes determining whether an ignition key is on; determining whether an engine is on or off if the key is on; and controlling a valve, such as a solenoid valve, that controls gear shifts, differently depending on whether the engine is on or off, such as by applying different duty values to the valve. A low duty value may be applied to the valve when the engine is off, and a higher duty value may be applied to the valve when the engine is on.

4 Claims, 2 Drawing Sheets

HYDRAULIC CONTROL SYSTEM OF VEHICLE

CROSS-REFERENCE TO RELATED APPLICATION

This application claims priority to, and the benefit of, Korean Patent Application No. 10-2007-0130423, filed in the Korean Intellectual Property Office on Dec. 13, 2007, the entire contents of which are incorporated herein by reference.

BACKGROUND OF THE INVENTION (a) Field of the Invention

The present invention relates to a hydraulic control system and method of an automatic transmission.

(b) Description of the Related Art

A typical automatic transmission uses solenoid valves to supply hydraulic pressure to operational elements (i.e. clutches and brakes) to change gears. Malfunction of the transmission is diagnosed by operating a specific one of the solenoid valves before starting the engine to form line pressure for an N→D speed change. The solenoid valve plunger is abruptly operated, creating noise which is amplified through the valve body. As shown in FIG. 4 at A, when the key is inserted into the ignition switch, a noise of about 25 dB occurs at an operating frequency of 300 Hz of the solenoid valve, and at B, a noise of about 24 dB occurs at an operating frequency of 700 Hz.

The above information disclosed in this Background section is only for enhancement of understanding of the background of the invention and therefore it may contain information that does not form the prior art that is already known in this country to a person of ordinary skill in the art.

SUMMARY OF THE INVENTION

A hydraulic control system of a vehicle includes a key detector that detects whether an ignition key is in an on state; a control portion that, if the key is on, outputs different control signals according to whether the engine is on; and a valve, such as a solenoid valve, that controls gear shifts according to the control signals from the control portion.

A hydraulic control method of an automatic transmission includes determining whether an ignition key is on; determining whether an engine is on or off if the key is on; and controlling a valve, such as a solenoid valve, that controls gear shifts, differently depending on whether the engine is on or off, such as by applying different duty values to the valve.

A first duty value may be applied to the valve when the key is on and the engine is off; and a second, higher duty value may be applied to the valve when the key is on and the engine is on.

DETAILED DESCRIPTION OF PREFERRED EMBODIMENTS

Figure 1:
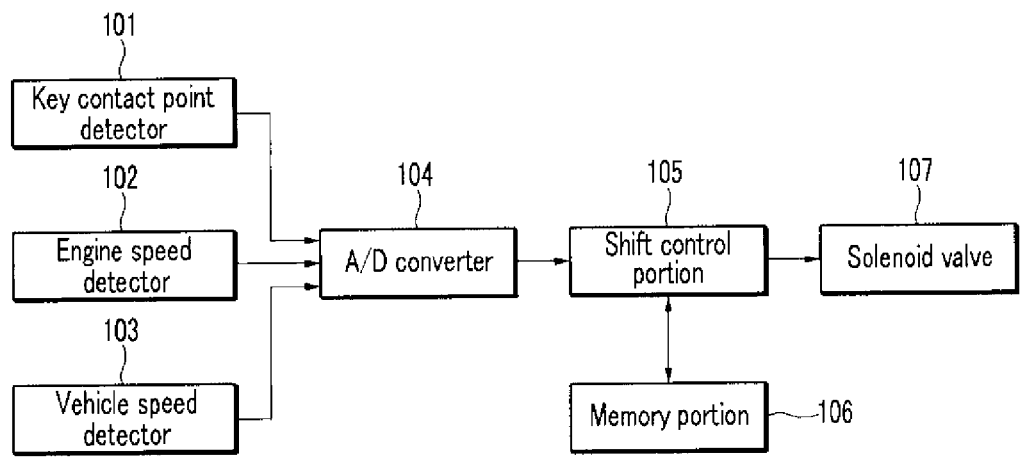
FIG. 1 is a block diagram of a hydraulic control system of a vehicle according to an exemplary embodiment of the present invention.

Referring to FIG. 1, an exemplary hydraulic control system includes a key contact point detector 101, an engine speed detector 102, a vehicle speed detector 103, an A/D converter 104, a shift control portion 105, a memory portion 106, and a solenoid valve 107.

The key contact point detector 101 detects whether an ignition key is in an on state. For example, for a rotatable key, the key contact point detector 101 may detect whether the key is turned to "on" (as opposed to "off," "acc," or "start"). Other types of keys, such as "smart keys," may be "on" in various ways, and the key contact point detector 101 may detect this "on" state in a variety of ways, which can be designed and implemented by a person of ordinary skill in the art, based on the teachings herein. The claimed invention is not limited to any type of key or key contact point detector 101.

The engine speed detector 102 may include a crank position sensor detecting an angle change of a crankshaft that is an output shaft of an engine, or a cam angle sensor detecting an angle change of a camshaft operating intake and exhaust valves. The engine speed detector 102 detects a rotation speed of the engine.

The vehicle speed detector 103 may be disposed at the output shaft of the transmission. The vehicle speed detector 103 detects the vehicle speed.

The exemplary detectors 101, 102, 103 output analog signals, and the A/D converter 104 transforms the signals to digital signals.

The shift control portion 105 may have inputs of a present vehicle speed, opening rate of a throttle valve (not shown), and a driving condition, determined by engine load. The shift control portion 105 determines a target shift-speed, such as with a map table. The shift control portion 105 operates the solenoid valve 107 such as by using pulse width modulation (PWM), and supplies hydraulic pressure to the necessary clutch and brake to shift the speed.

The shift control portion 105 may operate the solenoid valve 107 by using a first control duty value when the key contact point detector 101 determines that the ignition key is inserted into the ignition switch, when the engine is off. After that, when it is determined that the engine is being started, the shift control portion 105 may operate the solenoid valve 107 by using a second control duty value.

The first control duty value may be the smallest current that can overcome the elastic repulsive force of the solenoid valve 107. This minimizes movement of a plunger of the solenoid valve 107. An exemplary current is about 200 mA, but the current will vary with characteristics of the solenoid valve 107.

The second control duty value may be the largest current such that the oil pressure in a valve body of the transmission overcomes a damping repulsive force to the solenoid valve 107, and the elastic force of the solenoid valve 107, to maximize the movement of the plunger. An exemplary current is about 1 A, but will vary with oil pressure according to the size of the valve body, and the characteristics of the solenoid valve 107.

The memory portion 106 includes a program for operating the shift control portion 105, a shift pattern map table, and a map table that determines the appropriate current of the solenoid valve 107.

The solenoid valve 107 supplies a clutch and brake with the hydraulic pressure from the shift control portion 105, and controls the supply amount and the pressure thereof.

Figure 2:
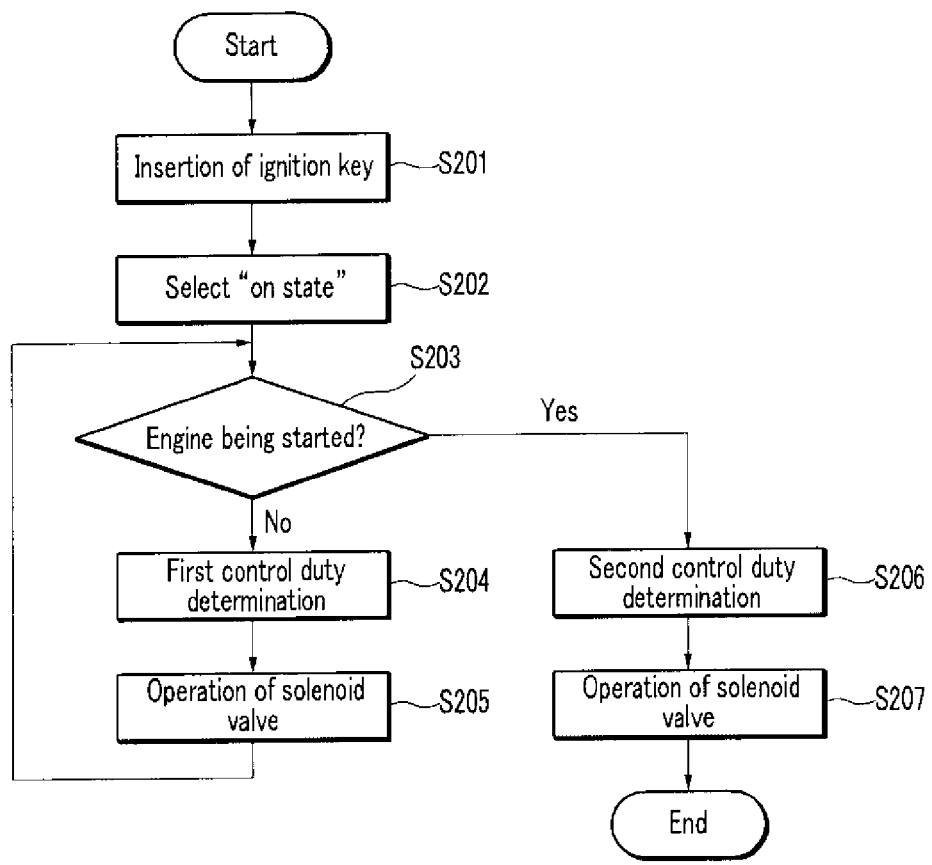
FIG. 2 is a flow chart of a hydraulic control method of an automatic transmission according to an exemplary embodiment of the present invention.

Referring to FIG. 2, operation of the exemplary transmission before and after starting of the engine is as follows.

In the exemplary case of a rotatable ignition key, the key is inserted into the ignition switch (S201) and the key contact point detector 101 detects the rotational position of the ignition key and sends a signal indicating this to the shift control portion 105 (S202). The shift control portion 105 determines whether the engine is being started or not by analyzing the data of the engine speed detector 102 (S203).

In step S203, when it is determined that the engine is not being started, the shift control portion 105 operates the solenoid valve 107 with the first control duty value (S204, S205). Since the control duty value is small, the solenoid valve 107 does not make noise.

With the solenoid valve 107 being operated by the first control duty, the shift control portion 105 returns to step S203.

When it is determined that the engine is started when the solenoid valve 107 is being operated by the first control duty value, the shift control portion 105 operates the solenoid valve 107 according to the second control duty value (S206, S207), assuring prompt responsiveness during a N→D shift.

Figure 3:
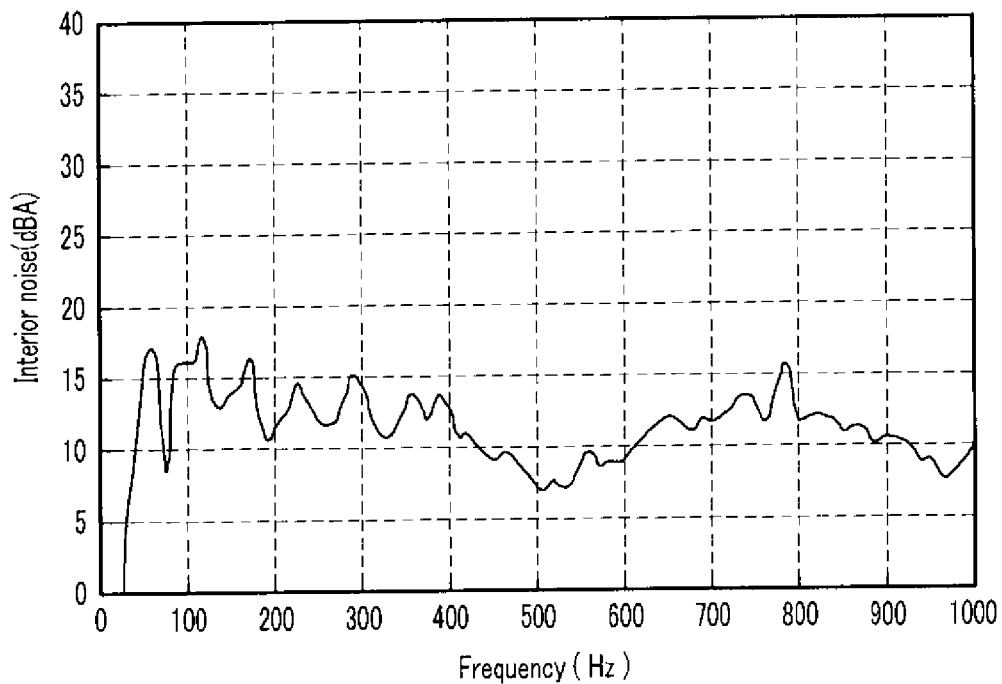
FIG. 3 is a graph illustrating noise characteristics of a shift control device of an automatic transmission according to an exemplary embodiment of the present invention.
Figure 4:
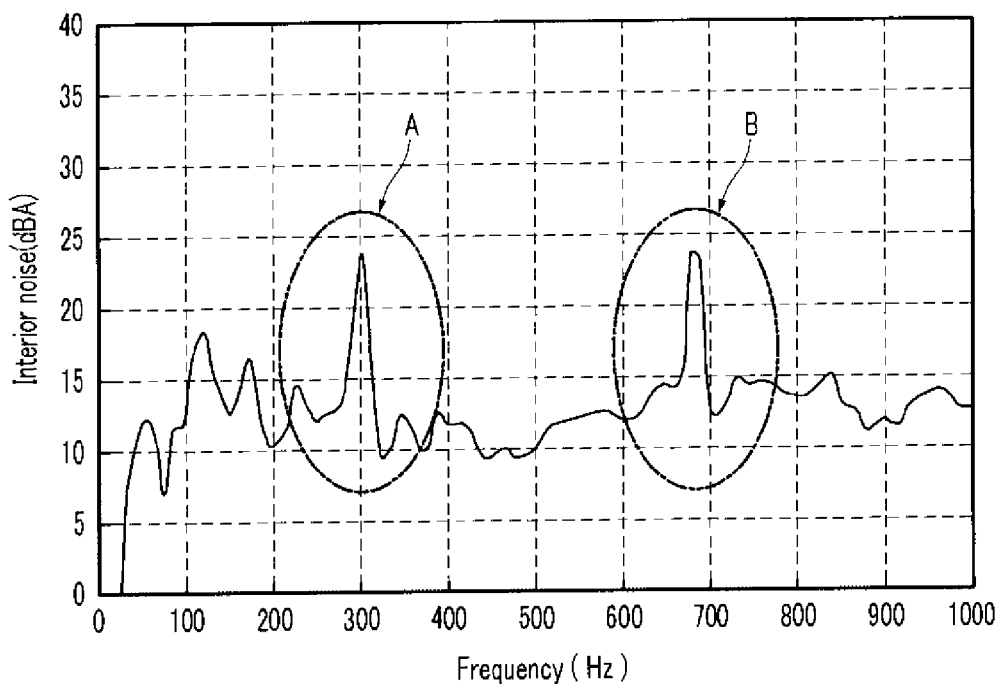
FIG. 4 is a graph illustrating noise characteristics of a shift control device of a conventional automatic transmission.

As a result, as shown in FIG. 3, the loud noises at 300 Hz and 700 Hz of the prior art do not occur.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of a vehicle, comprising:
   a key detector that detects whether an ignition key is in an on state;
   a control portion that outputs different control signals according to whether an engine is on, if the key is in the on state; and
   a solenoid valve that controls gear shifts according to the control signals from the control portion, the solenoid valve having a plunger;
   wherein a first control duty value is applied to the solenoid valve when the key is in the on state and the engine is off and a second control duty value which has higher duty value than the first control duty value is applied to the solenoid valve when the key is in the on state and the engine is on; and
   wherein the first control duty value is a minimum current to overcome an elastic repulsive force of the solenoid valve.

2. The system of claim 1, wherein the second control duty value is a largest current such that an oil pressure in the solenoid valve overcomes a damping repulsive force to the solenoid valve and the elastic repulsive force of the solenoid valve to maximize a movement of the plunger.

3. A hydraulic control method of an automatic transmission, comprising:
   determining whether an ignition key is in an on state;
   determining whether an engine is on or off if the key is in the on state; and
   controlling a solenoid valve that controls gear shifts differently depending on whether the engine is on or of;
   wherein a first control duty value is applied to the solenoid valve including a plunger when the key is in the on state and the engine is off and a second control duty value which has higher duty value than the first control duty value is applied to the solenoid valve when the key is in the on state and the engine is on; and
   wherein the first control duty value is a minimum current to overcome an elastic repulsive force of the solenoid valve.

4. The method of claim 3, wherein the second control duty value is a largest current such that the oil pressure in the solenoid valve overcomes a damping repulsive force to the solenoid valve and the elastic repulsive force of the solenoid valve to maximize a movement of the plunger.

* * * * *